United States Patent [19]

Schroeter

[11] Patent Number: 4,855,605
[45] Date of Patent: Aug. 8, 1989

[54] METHOD FOR PROTECTING OBJECTS FROM DESTRUCTION BY LASER BEAMS USING SOLID OR GASEOUS PROTECTIVE ELEMENTS

[75] Inventor: Johannes Schroeter, Bad Reichenhall, Fed. Rep. of Germany

[73] Assignee: Buck Chemisch-Technische Werke GmbH & Co., Bad Überkingen, Fed. Rep. of Germany

[21] Appl. No.: 159,353

[22] Filed: Feb. 23, 1988

[30] Foreign Application Priority Data

Feb. 23, 1987 [DE] Fed. Rep. of Germany ....... 3705694

[51] Int. Cl.$^4$ .......................... G21F 1/00; G21G 1/00
[52] U.S. Cl. .............................. 250/505.1; 250/515.1; 250/452.1
[58] Field of Search ............... 250/505.1, 515.1, 492.1; 376/103, 105; 350/266, 354

[56] References Cited

U.S. PATENT DOCUMENTS

| | | | |
|---|---|---|---|
| 3,620,597 | 11/1971 | Schwartz | 351/44 |
| 3,871,739 | 3/1975 | Paulsen | 250/515.1 |
| 3,967,582 | 7/1976 | Roberts et al. | 118/666 |
| 4,091,256 | 5/1978 | Früchtenicht | 376/120 |
| 4,114,985 | 9/1978 | Friedman | 250/505.1 |
| 4,290,847 | 9/1981 | Johnson et al. | 376/103 |
| 4,396,643 | 8/1983 | Kuehn et al. | 250/515.1 |
| 4,575,610 | 3/1986 | Gavin | 250/515.1 |
| 4,650,287 | 3/1987 | Kudo et al. | 250/515.1 |
| 4,732,454 | 3/1988 | Saito et al. | 250/492.2 |

*Primary Examiner*—Bruce C. Anderson
*Attorney, Agent, or Firm*—Watson, Cole, Grindle & Watson

[57] ABSTRACT

Solid protective elements such as cesium, thallium or luletium are dispersed in or layered on an object so that when a high energy laser beam strikes the object a highly ionized plasma is provided that absorbs or reflects the laser beam. Alternately, the object to be protected is surrounded with a gaseous protective element such as krypton or xenon.

21 Claims, 2 Drawing Sheets

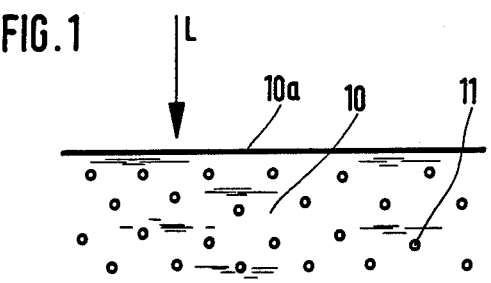
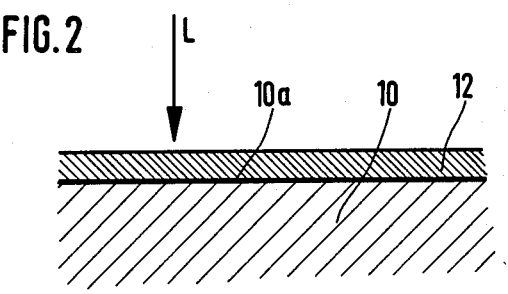
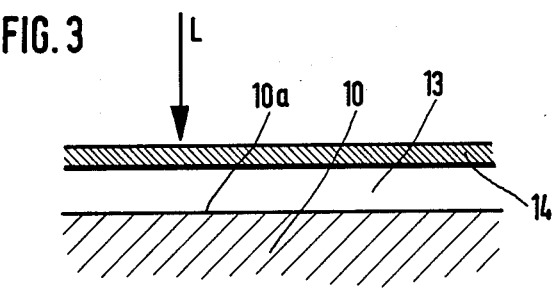
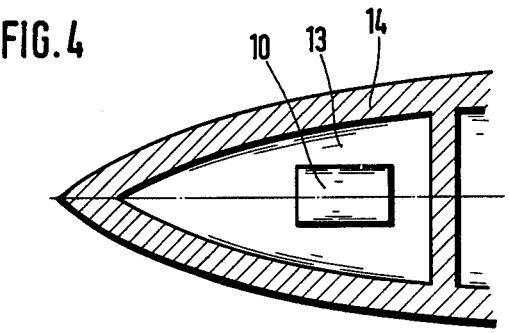

METHOD FOR PROTECTING OBJECTS FROM DESTRUCTION BY LASER BEAMS USING SOLID OR GASEOUS PROTECTIVE ELEMENTS

BACKGROUND OF THE INVENTION

1. Field of the Invention

The present invention relates to a method for protecting objects made of metals or plastic against high energy laser beams, and to objects so protected.

2. The Prior Art

Within the past few years research has been commenced and experiments conducted to discover ways to protect objects against lasers of high output density. However, these activities have been directed to finding materials and material constructions which are as resistant as possible to high energy laser beams. The results have involved thick, sometimes multi-layered protective shields, as well as protective casings, all of which considerably increase the weight of the object to be protected. This is a big disadvantage for objects such as satellites, space stations and very high flying missiles.

SUMMARY OF THE INVENTION

It was thus an object of the present invention to create a procedure for effectively protecting an object against lasers with high output density, without also increasing the weight of the object to be protected.

Unlike prior techniques, the present invention does not protect an object by a "armor" that is as resistant as possible to high energy laser beams, but rather provides a material in the radiation path of the laser which is converted instantaneously into a highly ionized plasma by the laser beam, this highly ionized plasma absorbing and/or reflecting the energy of the laser beam and thus preventing the laser beam from penetrating deeply into the object to be protected. The invention is applicable to objects made of metal, such as steel, aluminum and titanium, and plastic.

It should be noted that the phenomenon of a highly ionized plasma absorbing and reflecting a laser beam is already known from the metal processing industry. In this regard, it is known that when processing work pieces with laser beams a plasma is formed on certain materials by the evaporation of the material, and it has been determined that the plasma will absorb a large part of the energy of the laser beam and thus prevent a further penetration of the laser beam into the piece. In order to be able to penetrate deeply into certain materials by means of a laser beam it has thus become necessary to "blow away" this plasma with gases such as helium. The present invention utilizes this protective effect of the highly ionized plasma for the protection of an object.

A theoretical analysis of the invention will be explained as follows. A high-energy laser beam with an output density above $10^4$ W/cm$^2$ evaporates material from the surface of a solid material body. Free electrons are present in the resulting vapor. Through shock procedures they absorb energy from the electromagnetic laser field. The increase of energy in the electrons is calculated as follows:

$$\frac{d\epsilon}{dt} \simeq \frac{e^2 F^2}{m^2} - 2 \frac{m}{M} \epsilon \gamma_{st} \quad (1)$$

e = elementary charge of the electron
F = field strength of the laser field
m = electron mass
$\omega$ = frequency of laser radiation
M = relative atom mass of the uncharged atoms
$\epsilon$ = energy of the electrons
$Y_{st}$ = shock frequency of the electrons and atoms.

The electrons can attain the maximum energy:

$$\epsilon_{max} \simeq \frac{e^2 F^2 M}{2m^2 \omega^2} \quad (2)$$

When the electron energy becomes as large as the energy $\epsilon_{ion}$, needed for the ionization of the neutral atoms, there is an avalanche-like release of electrons. The resulting highly ionized plasma absorbs or reflects the laser radiation to a high degree, which is a result obtained theoretically as well as documented by the above-mentioned interference with the laser beam in material processing.

A material which provides protection against an energy rich laser radiation also has to permit the rapid formation of a highly ionized plasma. Suitable materials can be determined by the equations (1) and (2) as well as by $\epsilon_{ion}$. In equation (1) the material enters through its relative atomic mass M, and that into the second term of the parenthesis. With exact consideration $\gamma_{st}$ is not a constant, but is dependent on M, whereby, however, for the qualitative selection of suitable materials this dependency can be ignored. It is also possible to qualitatively say that the speed of energy increase by the electrons increases with rising M. The maximum energy which the electrons can attain in a given laser field also increases with M according to equation (2). In this it has to be greater than the first ionization energy $\epsilon_{ion}$ of the material. Thus, it can be determined as starting criterion for suitable protective materials that the quotient from M and $\epsilon_{ion}$ has to be as large as possible. If one looks at the periodic system, the quotient $M/\epsilon_{ion}$ is particularly high for radioactive elements, but they are, understandably, not suitable as protective materials for the present purpose. However, they are suitable as solid protective materials, particularly in the cited sequence cesium, thallium, lutetium, bismuth, lead and other lanthanides. Among the gaseous elements xenon and krypton are particularly suitable as radon is not stable.

The selection of the protective material to be used should be done according to the above criteria, whereby the cited elements, by themselves or in combination, provide high protection.

The invention will be better understood by reference to the accompanying drawings, which depict various preferred embodiments of the invention.

BRIEF DESCRIPTION OF THE DRAWINGS

FIG. 1 schematically depicts a surface portion of an object to be protected, a protective material in solid form being dispersed therein, FIG. 2 schematically depicts a surface portion of an object to be protected, a protective material in solid form being layered thereon, FIG. 3 schematically depicts a surface portion of an object to be protected, a casing being positioned thereover and a protective material in gaseous form being contained therebetween, FIG. 4 schematically depicts a composite object in the form of the head of a missile, a protective material in gaseous form surrounding the ignition element therein.

DETAILED DESCRIPTION OF THE PREFERRED EMBODIMENTS

Figure 5:
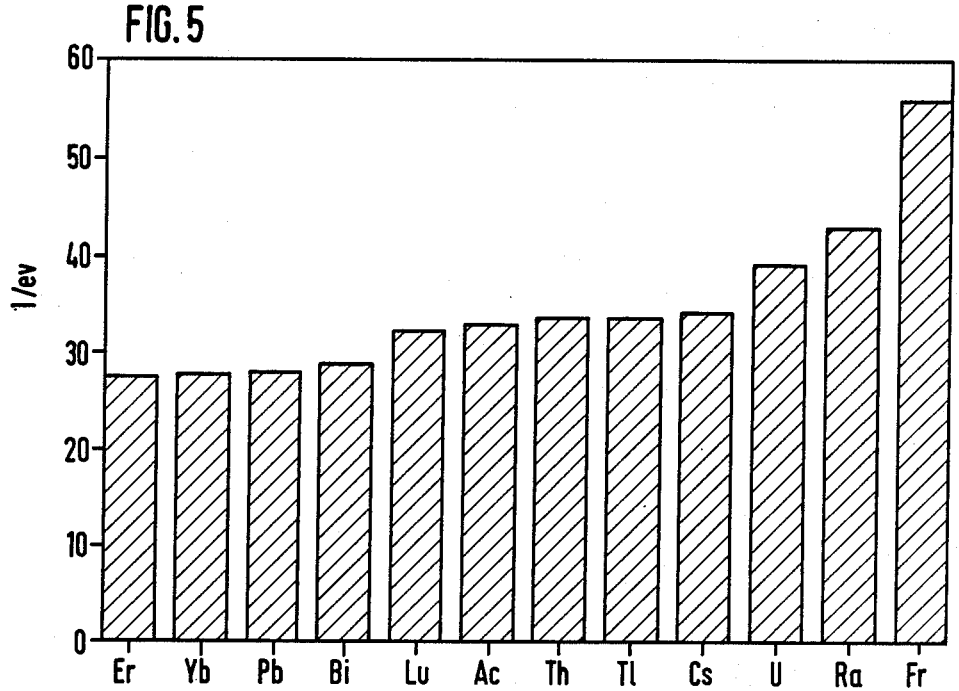
FIG. 5 is a graphic representation of the relative suitabilities of various solid elements which can be used as protective materials according to the present invention.

FIG. 1 shows an outer portion of an object (or material) 10 to be protected from a high energy laser beam, the object having an outer surface 10a. In the area near the outer surface of the object 10, a protective material 11 in solid form is dispersed. It can be incorporated in the object by sintering, diffusion, alloying, etc. If a laser beam L hits the surface 10a, the imbedded particles of protective material 11 become instantaneously evaporated, and a highly ionized plasma is formed at the impact point of laser L. This highly ionized plasma absorbs and reflects the energy of the laser beam L with the effect that the laser beam is able to penetrate the protected object only during a short initial phase, but is prevented from doing so after the formation of the plasma.

In FIG. 2 a layer 12 of protective material in solid form is applied to the surface 10a of the object 10, the layer being applied by plating, spraying, painting, etc. Similarly to FIG. 1, the protective material in the layer forms a highly ionized plasma immediately after being impacted by the laser beam L, which then prevents the penetration of the laser beam into the object.

FIG. 3 shows the use of a gaseous protective material 13. In this embodiment a casing 14 is positioned around the object 10 so as to leave a space therebetween, and protective material 13 in gaseous form is located in the space. The protective effect against the impacting laser beam L essentially corresponds to the effect according to FIGS. 1 and 2. The casing 14 can be made of the same material for the protective casing 14 as object 10, or it can be composed of some other material, or even the solid protective material of this invention.

FIG. 4 shows a composite object in the form of the head of a missile, the head including an inner ignition element 10 to be protected and an outer casing 14. A protective material 13 in gaseous form surrounds the inner ignition element. The protective effect is the same as according to the embodiment in FIG. 3.

FIG. 5 indicates some of the elements which are particularly useful as the solid protective materials according to the present invention, the elements being identified on the abscissa and the already mentioned quotient $M/\epsilon_{ion}$ being identified on the ordinate. The suitability of these elements as a protective material increases with the quotient. The elements with the highest quotients are most desirable, i.e., to the extent that they are stable. The elements themselves provide a high degree of protection if they are embedded in relatively small amounts in the surface area of the object to be protected (FIG. 1) or if the protective layer formed by them (FIG. 2) is comparatively thin. In any case, the increase in weight for the object is slight or even negligible.

Figure 6:
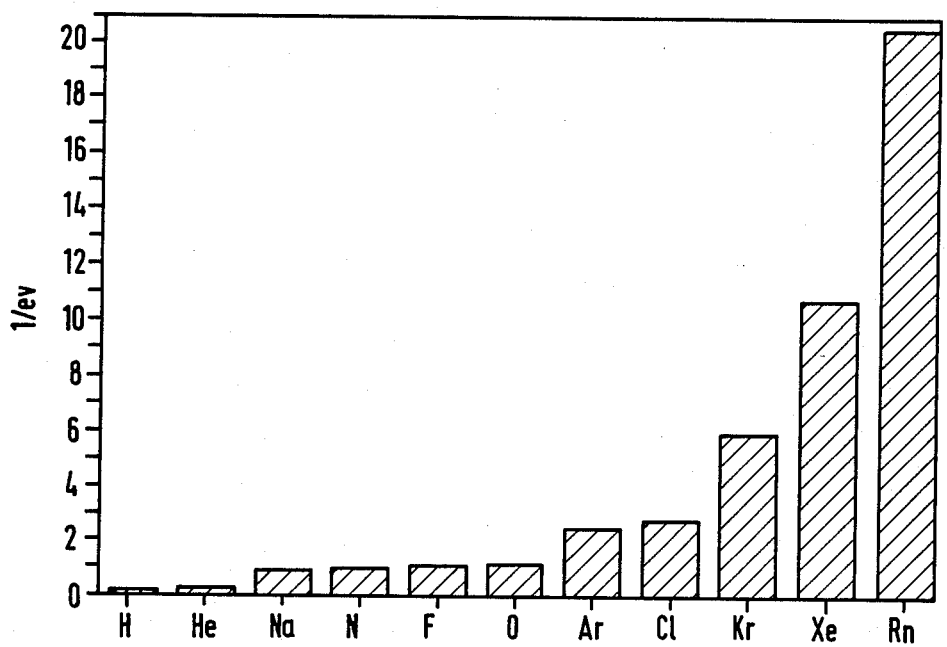
FIG. 6 is a graphic representation of the relative suitability of various gaseous elements which can be used as protective materials according to the present invention.

FIG. 6 indicates the elements which are particularly suitable as gaseous protective materials according to the invention. The suitability also increases with the quotient $M/\epsilon_{ion}$. It can be seen that xenon and krypton are particularly suitable as protective gases. In this case too, the weight increase of the object is slight, particularly if only sensitive parts of the object are protected, as shown in FIG. 4.

It is certainly possible for modifications to be made to the embodiments as shown and still fall within the scope of the invention. For example, it is possible to employ multiple protective layers, possibly from varying protective materials or alternatingly protective materials and material to be protected. It is also possible to provide for varying protective measures on the same object. For example, the full casing of a rocket can be coated with protective material (FIG. 2) and, in addition, the particularly vulnerable inner sections containing the ignition element can be filled with protective gas (FIG. 4). The protective gas can also contain a non-gaseous substance with the highest possible quotient $M/\epsilon_{ion}$ in a finely distributed form, such as a powder which is kept in suspension by a blower. It is also conceivable that the casing of the object to be protected could be provided with a layer of protective material on the inside as well as on the outside. Finally, in certain applications, the complete casing of the object to be protected could consist of protective material. It is only essential that the protective material forms a plasma which absorbs and/or reflects the laser beam before the laser beam impacts the endangered parts of the object to be protected.

I claim:

1. A method of forming an object which will resist destruction by a high energy laser beam, said method comprising the steps of (1) providing an object which has a outer surface, (2) providing a solid protective material which, when irradiated with a high energy laser beam, will form a highly ionized plasma which will absorb and/or reflect a high energy laser beam, and (3) dispersing said solid protective material in said outer surface of said object.

2. A method according to claim 1, wherein said protective material is an element having a quotient of relative atomic mass of uncharged atoms (M) to energy needed for ionization of neutral atoms ($\epsilon_{ion}$) of greater than 20.

3. A method according to claim 2, wherein said protective material is an element selected from the group consisting of Er, Yb, Pb, Bi, Lu, Ac, Th, Tl and Cs.

4. A method according to claim 3, wherein said protective element is selected from the group consisting of Cs, Tl, Lu, Bi and Pb.

5. A method according to claim 1, wherein said object is made of a metal selected from the group consisting of steel, aluminum or titanium.

6. A method according to claim 1, wherein said object is made of plastic.

7. A method according to claim 1, wherein said protective material is dispersed in the outer surface of said object by sintering, diffusion or alloying.

8. A method of forming an object which will resist destruction by a high energy laser beam, said method comprising the steps of (1) providing an object which has an outer surface, (2) providing a solid protective material which, when irradiated with a high energy laser beam, will form a highly ionized plasma which will absorb and/or reflect a high energy laser beam, and (3) forming a layer of said solid protective material over said outer surface of said object.

9. A method according to claim 8, wherein said protective material is an element having a quotient of relative atomic mass of uncharged atoms (M) to energy needed for ionization of neutral atoms ($\epsilon_{ion}$) of greater than 20.

10. A method according to claim 9, wherein said protective material is an element selected from the group consisting of Er, Yb, Pb, Bi, Lu, Ac, Th, Ti, and Cs.

11. A method according to claim 10, wherein said protective element is selected from the group consisting of Cs, Tl, Lu, Bi and Pb.

12. A method according to claim 8, wherein said object is made of a metal selected from the group consisting of steel, aluminum or titanium.

13. A method according to claim 8, wherein said object is made of plastic.

14. A method according to claim 8, wherein said layer of protective material is applied to the outer surface of said object by spraying, painting, plating or coating.

15. A method according to claim 8, including the step of applying an additional layer of protective material to said object.

16. A method of forming an object will resist destruction by a high energy laser beam, said method comprising the steps of (1) providing an object which has an outer surface, (2) providing a casing around said object so as to form a space between said casing and the outer surface of said object, and (3) filling said space with a gaseous protective material which, when irradiated with a high energy laser beam, will form a highly ionized plasma irradiated with a high energy laser beam which will absorb and/or reflect a high energy laser beam, said gaseous protective material containing a gaseous element having a quotient of relative atomic mass of uncharged atoms (M) to energy needed for ionization of neutral atoms ($\epsilon_{ion}$) of greater than 5.

17. A method according to claim 16, wherein said gaseous protective element is Kr or Xe.

18. A method according to claim 17, including the step of dispersing in said casing a solid protective element which, when irradiated with a high energy laser beam, forms a highly ionized plasma which will absorb and/or reflect the beam.

19. An object which is protected from destruction by a high energy laser beam, said object comprising an outer surface and a solid protective element dispersed therein near its outer surface, said solid protective element, when impacted by a high energy laser beam, providing a highly ionized plasma which absorbs and/or reflects said beam, said object being made of metal or plastic and said protective element having a quotient of relative atomic mass of uncharged atoms (M) to energy necessary for ionization of neutral atoms ($\epsilon_{ion}$) of greater than 20.

20. An object which is protected from destruction by a high energy laser beam, said object including an outer layer of a solid protective element which, when impacted by a high energy laser beam, provides a highly ionized plasma which absorbs and/or reflects said beam, said object being made of metal or plastic and said protective element having a quotient of relative atomic mass of uncharged atoms (M) to energy necessary for ionization of neutral atoms ($\epsilon_{ion}$) of greater than 20.

21. A composite object which has an inner element protected from destruction by a high energy laser beam, said composite object including an inner element, an outer element which is spaced from the inner element to provide a chamber therebetween, and a gaseous protective element in said chamber, said gaseous protective element, when impacted by a high energy laser beam, providing a highly ionized plasma which absorbs and/or reflects said beam, said gaseous protective element having a quotient of relative atomic mass of uncharged atoms (M) to energy necessary for ionization of neutral atoms ($\epsilon_{ion}$) of greater than 5.

* * * * *